US012750226B2

(12) United States Patent
Chang et al.

(10) Patent No.: US 12,750,226 B2
(45) Date of Patent: *Sep. 29, 2026

(54) PERSISTENT LOGIN

(71) Applicant: Synchrony Bank, Stamford, CT (US)

(72) Inventors: Shaoyen Chang, Stamford, CT (US); William Mahoney, Stamford, CT (US); Chidhambaram Mathevan Pillai, Stamford, CT (US); Seulkee Park, Stamford, CT (US); Jeremy T. Mack, Brighton, MI (US); Shahul Shaik, Hyderabad (IN); Sathyanarayana Mahendran, Hyderabad (IN); Marina Loginova, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 6 days.

This patent is subject to a terminal disclaimer.

(21) Appl. No.: 19/001,677

(22) Filed: Dec. 26, 2024

(65) Prior Publication Data

US 2025/0219834 A1 Jul. 3, 2025

Related U.S. Application Data

(63) Continuation of application No. 18/430,766, filed on Feb. 2, 2024, now Pat. No. 12,219,065, which is a (Continued)

(51) Int. Cl.
*H04L 9/32* (2006.01)
*H04L 9/08* (2006.01)
(Continued)

(52) U.S. Cl.
CPC ............ *H04L 9/3213* (2013.01); *H04L 9/088* (2013.01); *H04L 9/3226* (2013.01); (Continued)

(58) Field of Classification Search
CPC ..... H04L 9/3213; H04L 9/088; H04L 9/3226; H04L 63/105; H04L 63/1433;
(Continued)

(56) References Cited

U.S. PATENT DOCUMENTS 9,178,868 B1 11/2015 Leung et al.
11,122,035 B2 9/2021 Smolny
(Continued)

OTHER PUBLICATIONS

Notice of Allowance mailed Jan. 26, 2022 in U.S. Appl. No. 17/083,692.

(Continued)

*Primary Examiner* — Izunna Okeke
(74) *Attorney, Agent, or Firm* — Polsinelli PC

(57) ABSTRACT

Systems and methods are provided for persistent login. Such persistent login may be based on linking user identity across accounts of different entities to allow each entity to maintain control over their respective sets of user data, while providing a streamlined user experience that avoids much of the repetitive need to login to different services with different login credentials (e.g., during periods of heavy use). Such persistent login may utilize a set of tokens issued and exchanged between devices of the partnering entities. Such tokens may include an access token, refresh token, and identity token. When a user associated with a first entity requests access to information secured by a second entity, such request may be associated with the access token. If the access token is determined to be expired, the refresh token may be used to refresh the access token, which may also trigger issuance of a new refresh token. The refreshed access token may be used in conjunction with the identity token to access the requested information secured by the second entity.

21 Claims, 11 Drawing Sheets

Related U.S. Application Data continuation of application No. 18/312,615, filed on May 5, 2023, now Pat. No. 11,943,356, which is a continuation of application No. 17/728,416, filed on Apr. 25, 2022, now Pat. No. 11,689,368, which is a continuation of application No. 17/083,692, filed on Oct. 29, 2020, now Pat. No. 11,349,662.

(60) Provisional application No. 62/927,552, filed on Oct. 29, 2019.

(51) Int. Cl.

| | |
|---|---|
| ***H04L 9/40*** | (2022.01) |
| ***H04L 67/306*** | (2022.01) |

(52) U.S. Cl.

CPC ........ *H04L 63/105* (2013.01); *H04L 63/1433* (2013.01); *H04L 67/306* (2013.01)

(58) Field of Classification Search

CPC ............. H04L 67/306; H04L 2463/121; H04L 9/3228; H04L 9/3234; H04L 63/068; H04L 63/0807; H04L 67/02

See application file for complete search history.

(56) References Cited

U.S. PATENT DOCUMENTS

| | | | | |
|---|---|---|---|---|
| 2014/0075513 | A1 | 3/2014 | Trammel et al. | |
| 2015/0249660 | A1* | 9/2015 | Bailey | G06F 21/30 726/8 |
| 2020/0005278 | A1* | 1/2020 | Vudathu | G06Q 20/227 |
| 2024/0104567 | A1* | 3/2024 | Hockey | G06Q 20/4014 |

OTHER PUBLICATIONS

Notice of Allowance mailed Feb. 8, 2023 in U.S. Appl. No. 17/728,416.

Notice of Allowance mailed Jan. 5, 2024 in U.S. Appl. No. 18/312,615.

Notice of Allowance mailed Sep. 26, 2024 in U.S. Appl. No. 18/430,766.

* cited by examiner

PERSISTENT LOGIN

CROSS-REFERENCE TO RELATED APPLICATIONS

The present patent application is a continuation of U.S. patent application Ser. No. 18/430,766 filed Feb. 2, 2024, now U.S. Pat. No. 12,219,065, which is a continuation of U.S. patent application Ser. No. 18/312,615 filed May 5, 2023, now U.S. Pat. No. 11,943,356, which is a continuation of U.S. patent application Ser. No. 17/728,416 filed Apr. 25, 2022, now U.S. Pat. No. 11,689,368, which is a continuation of U.S. patent application Ser. No. 17/083,692 filed Oct. 29, 2020, now U.S. Pat. No. 11,349,662, which claims the priority benefit of U.S. Provisional Patent Application 62/927,552 filed Oct. 29, 2019, all of which are incorporated herein by reference in their entireties.

BACKGROUND OF THE INVENTION

Field of the Invention

The present invention generally relates to persistent login. More specifically, the present invention relates to z persistent login across multiple user accounts while maintaining and supporting independent controls.

Description of the Related Art

There are presently a number of entities with online presence, including online applications and websites. Such entities may transact their online transactions by inter alia partnering with each other, particularly in relation to users (e.g., customers, clients) in common. For example, an e-commerce site may partner with a credit card service provider to provide their users with co-branded financial services. One challenge in implementing such partnerships is that the user may need to register with each entity separately. As such, a user may have an account with an e-commerce site, as well as another account with the financial institution. While the partnering entities may link to each other, such accounts have been managed individually in accordance with each entity's set of credentials. Users may often become confused, however, and/or fail to realize or remember that there may be two or more different accounts associated with such partnership. Such user confusion may therefore result in a poor user experience, as well as failed or abandoned transactions for both the online entities.

In some instances, partnered entity may wish to provide users with a single sign-on (SSO) service in order to streamline the user experience. Instead of signing into multiple different accounts for each entity, SSO generally only requires that a user provide a single set of credentials. Traditional SSO allows for a particular user's credentials to be managed by a single identity management service (e.g., Google, Facebook), but used and relied-upon by multiple other services (who therefore do not need to provide their own respective identity management server). Such SSO services may use the standard OAuth framework whereby the identity manager may provide other services with an access token that allows access to certain information associated with the user without exposing other information (e.g., password).

While such traditional SSO services may have the advantage of avoiding multiple different user accounts (thereby avoiding the need to remember different sets of login credentials) and may therefore streamline transactions, there are also complications that may arise. For example, certain entities, such as banks or other financial institutions, may desire more fine-grained control over certain user data and functions where certain actions may require a higher level of security and authentication (e.g., password rules, two-factor authentication) than others. Such different levels are not possible in such traditional SSO-type services that are currently available.

There is, therefore, a need in the art for improved systems and methods for linking identity for persistent login.

SUMMARY OF THE CLAIMED INVENTION

Embodiments of the present invention allow for linked identity for persistent login. Such linked identity may allow each entity to maintain control over their respective sets of user data for the user, while providing a streamlined user experience that avoids much of the repetitive need to login to different services with different login credentials (e.g., during periods of heavy use). Such persistent login may utilize a set of tokens issued and exchanged between devices of the partnering entities. Such tokens may include an access token, refresh token, and identity token. When a user associated with a first entity requests access to information secured by a second entity, such request may be associated with the access token. If the access token is determined to be expired, the refresh token may be used to refresh the access token, which may also trigger issuance of a new refresh token. The refreshed access token may be used in conjunction with the identity token to access the requested information secured by the second entity.

DETAILED DESCRIPTION

Embodiments of the present invention allow for linked user identity for persistent login. Such linked identity may allow different entities to maintain control over their respective sets of user data, while providing a streamlined user experience that avoids much of the repetitive need to login to different services with different login credentials (e.g., during periods of heavy use).

Figure 1A:
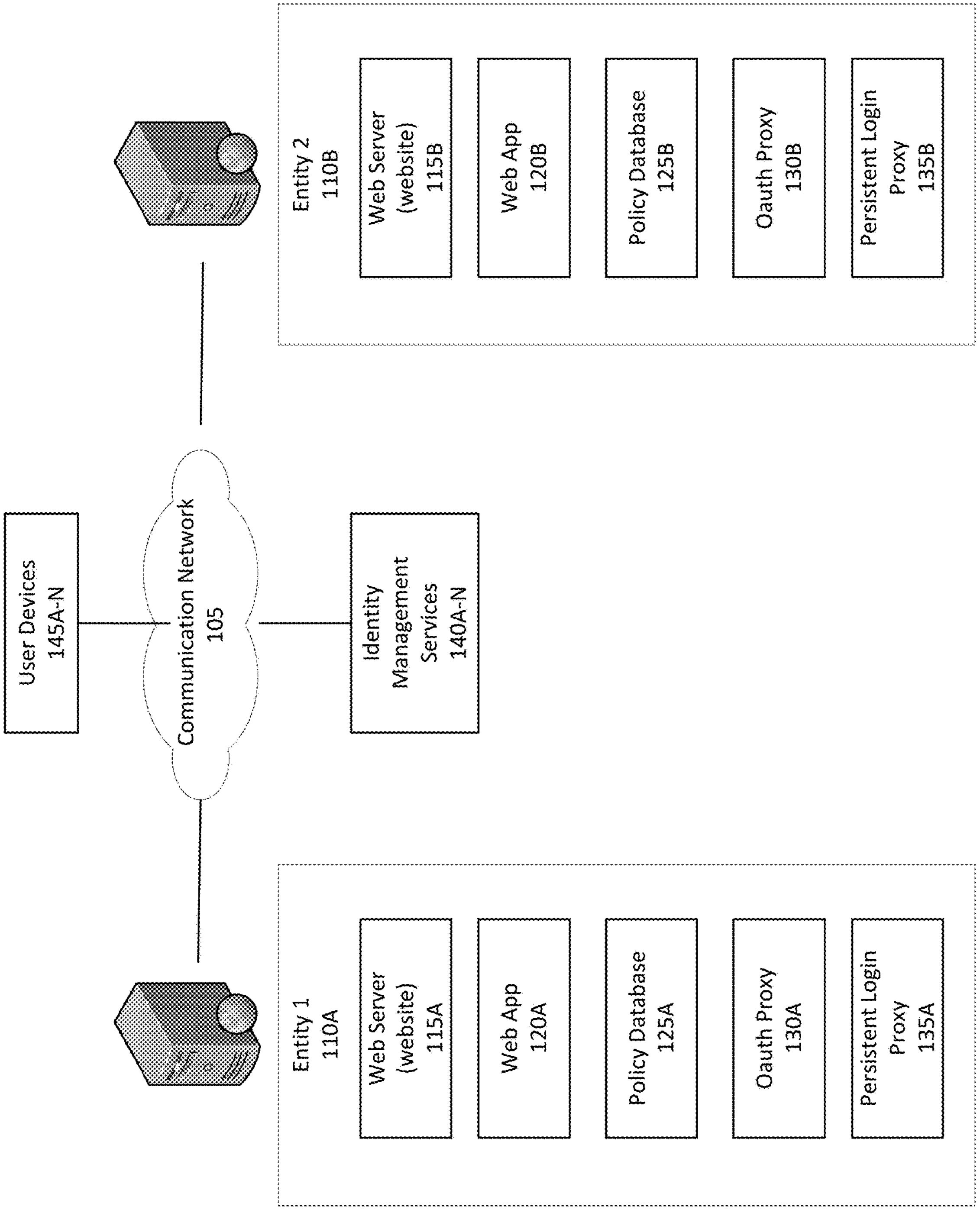
FIG. 1A illustrates an exemplary network environment in which a system of linking identity for persistent login may be implemented.

FIG. 1A illustrates an exemplary network environment in which a system of linking identity for persistent login may be implemented. The illustrated network environment includes a communication network 105 and the respective systems (110A and 110B) of two different entities (Entity 1 and Entity 2), as well as identity management services 140A-N and user devices 145A-N. Further, each entity system 110A-B may further include web server(s) 115A-B, web application(s) 120A-B, policy database(s) 125A-B, OAuth prox(ies) 130A-B, and persistent login prox(ies) 135A-B.

Each communication (e.g., between systems 110, services 140, and devices 145) can occur over one or more communication network(s) 105. Any combination of open or closed networks can be included in the communication network 105. Examples of suitable networks include the Internet, personal area networks, a local area networks (LAN), wide area networks (WAN), wireless local area networks (WLAN), and other networks known in the art. The communication network 105 can further be inclusive of intranets, extranets, and combinations thereof. Examples of communication network service providers are the public switched telephone network, a cable service provider, a provider of digital subscriber line (DSL) services, or a satellite service provider. Communications network 105 allows for communication between the various components of network environment.

Each of the different systems 110A-B may be controlled by a specific entity. As used herein, entity may refer to a business (including online business), organization, brand, or other type of body that exercises control over a respective system 110. Entity systems 110A-B may vary by entity and include any number and combination of computer system components, servers, apparatuses, and devices associated with performing operations of the associated entity. As illustrated in FIG. 1A, however, entity systems 110A-B may include components associated with implementing persistent login.

Web server 115 may be inclusive of any web server or servers known in the art, as well as other computing devices that may include standard hardware computing components such as network and media interfaces, non-transitory computer-readable storage (memory), and processors for executing instructions or accessing information that may be stored in memory. The functionalities of multiple servers may be integrated into a single server or may be distributed over multiple serves and associated devices. In an exemplary embodiment, web server 115 may support a variety of websites, webpages, and web-based services associated with the respective entity. For example, an entity that is an online business may offer users access to business-related data and services via online sites, pages, and portals provided by web server 110.

Web application 120 may be inclusive any type of application known in the art for executing functions in an online or web setting. Web application 120 may be installed on and/or executable on web server 115 or other associated device, system, or server to perform specified web or online operations for the associated entity system 110. In exemplary embodiments, web application 120 may be executable to manage client or user login for the entity system 110. As mentioned above, where the entity may be an online business, and such online business may wish to provide individual users with access to their respective data in a secure manner. A web application 120 may be used to elicit user credentials (e.g., user name, password) in accordance with login policies and to authenticate such credential before providing access to certain data or services.

Policy database 125 may be inclusive any storage structure maintained in one or more memory, which may be local, remote, or distributed. In exemplary embodiments, policy database 125 may include any variety of policies (e.g., rules, requirements, etc.) associated with account linking and persistent login. An exemplary policy may specify certain authentication requirements in order to link accounts and to access certain account data or calling specific services and APIs. Such policies may be determined by the associated entity, such that each entity may maintain different custom sets of policies governing the extent of access and types of authentication requirements over their respective data and services. As such, the ability to access and execute certain data and services may be controlled in accordance with the policies specified by the associated entity and maintained in policy database 125. The entity may further update and implement policies dynamically and in real-time by updating policy database 125.

Figure 1B:
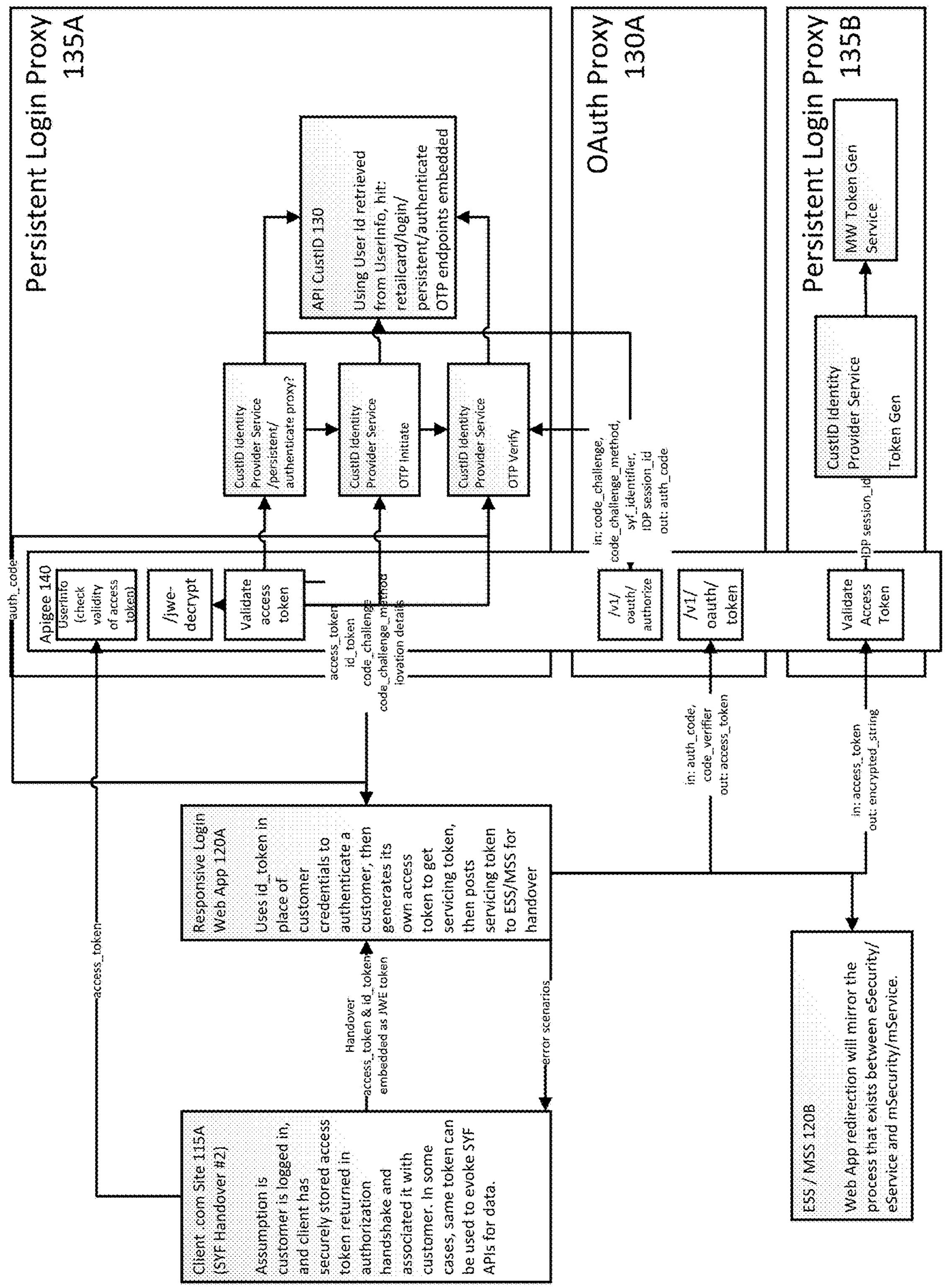
FIG. 1B illustrates exemplary information flows within a specific implementation of the system of FIG. 1A.

While different existing access authorization and delegation systems may be used, one specific example (OAuth) is referenced herein. As such, FIGS. 1A-B illustrate an OAuth proxy 130, which may be used in accordance with inter alia OAuth 2.0 standards to link two different user accounts, each associated with two systems 110A-B (e.g., controlled by different entities). OAuth proxy 130 allows different systems 115A-B to use the OAuth framework to exchange access tokens, which are the basis of linking the associated user accounts. In exemplary embodiments, different access tokens may be exchanged between two different entities in relation to accounts associated with the same user. Each access token may be associated with a different scope of authorization (e.g., types of data or services). The access token(s) may thereafter be used by the first entity system 115A to call one or more APIs (application programming interfaces) associated with the second entity system 115B in order to access certain data and services available to the requesting user (e.g., user of a user device 145).

Persistent login proxy 135A-B may use the account linkage established by OAuth proxy 135 in a manner that persists over time. Whereas access tokens may be associated with a period of expiration, persistence of the login may be achieved by refreshing the access token. As described in detail herein, such refresh may rely on a refresh token issued by the entity system 115B being linked another entity system 115A. Rather than issuing a single access token, therefore, persistent login proxy 135B may issue and manage a set of tokens, which may include at least an access token, a refresh token, and an identity token. The set of tokens may be provided to the first entity system 115A. A user (e.g., user of user device 145) that is authenticated may therefore link their user account associated with a first entity system 110A with their user account associated with a second entity system 110B, such that certain data and services available from the second entity system 110B may be accessible via a user landing page or portal of the first entity system 110A. Persistent login proxy 135 may further be configured to encrypt and decrypt tokens (and associated strings) exchanged between different entity systems 110.

The network environment above may be deployed between a first entity system 110A and second entity system 110B. Such deployment may include registering the first entity system 110A (and associated endpoint(s)) with the second entity system 110B (and associated endpoint(s) and API(s)). The first entity (e.g., the entity that makes the call for data from another entity) may add or build the features and components (e.g., 115-135) into their respective system 110A to support account linkage and persistent login, as well as provide certain data (e.g., user interface, screen displays) to the second entity. In some embodiments, code snippets or software development kits (SDKs) may be provided to facilitate build or deployment of persistent login implementations.

Identity management services 140A-N may be inclusive any service provider systems known in the art for managing identity. Some implementations may include identity management services 140A-N specific to one or more entities. In some embodiments, however, identity management services 140A-N may be operated by third party identity management entities. Such identity management services 140A-N may be used to manage identity in accordance with OAuth standards User devices 145A-N may include any types of computing device or system used by a user to communicate with entities 1 and 2. Such user devices 145!-N may include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of user devices 145A-N may include desktop computers, laptop computers, server computers, hand-held computers, tablets, smart phones, personal digital assistants, digital home assistants, as well as machines and apparatuses in which a computing device has been incorporated.

FIG. 1B illustrates exemplary information flows within a specific implementation of the system of FIG. 1A. As illustrated in FIG. 1B, the network environment may include a first entity site (e.g., "Client.com site" that may be provided by web server 115) in communication with a web application 120 (e.g., "Responsive Login Web App") and an e-commerce application programming interface (e.g., "Ecom API CustID) associated with a second entity 110B. As noted in relation to FIG. 1A, communications within the network environment may use presently available communication networks 105, including local, proprietary networks (e.g., an intranet) and/or may be a part of a larger wide-area network (e.g., Internet). In some embodiments, a persistent login proxy 135A-B may be associated with the first entity and the second entity. Exemplary systems may further use architectures for delegating access authority (e.g., OAuth); such systems may therefore include a proxy 130 (e.g., OAuth Proxy) that facilitates associated functions of the architectures. The workflows illustrated in FIG. 1A-B are discussed in further detail with respect to the screenshots presented in FIGS. 2A-2B and the method of FIG. 3.

Figure 2A:
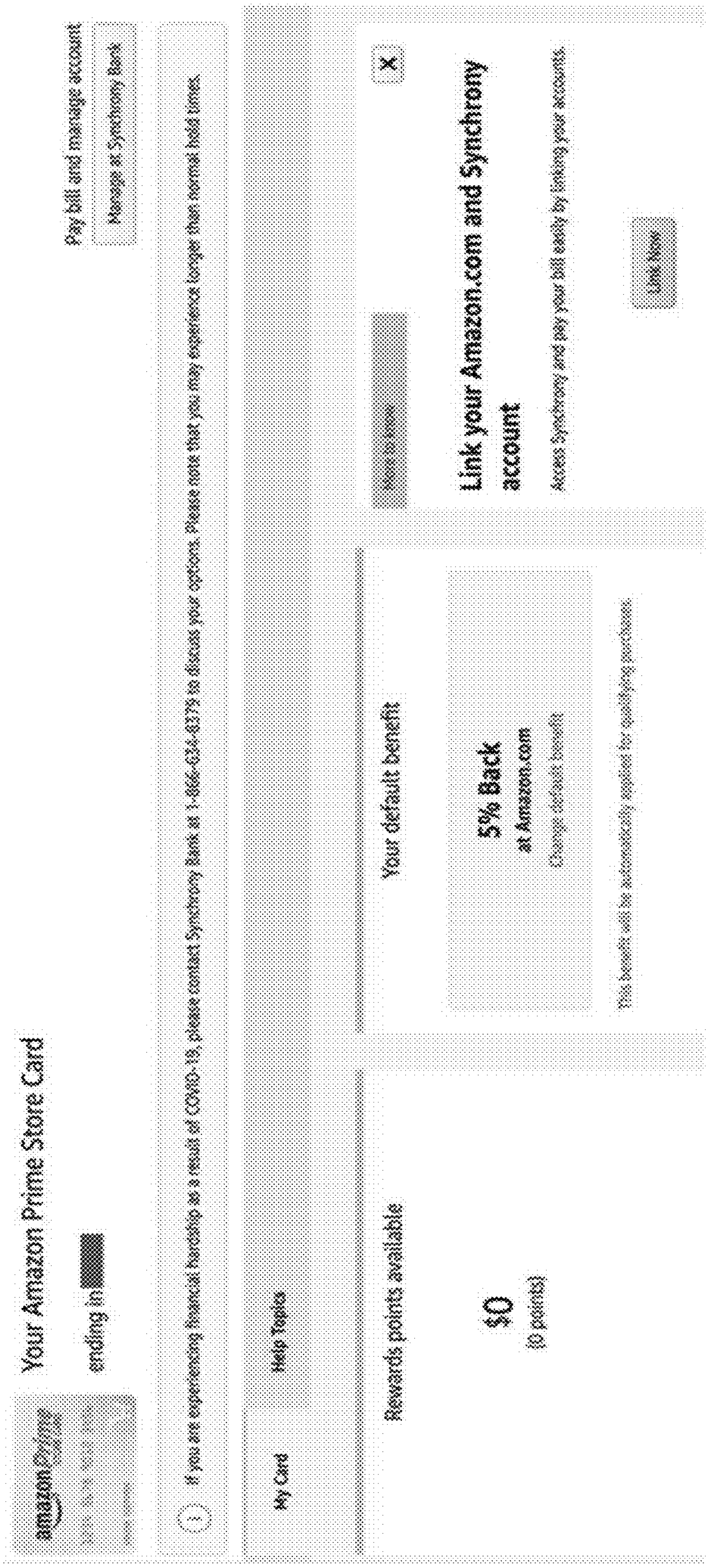
FIG. 2A is a screenshot of an exemplary webpage associated with a first online business.
Figure 2B:
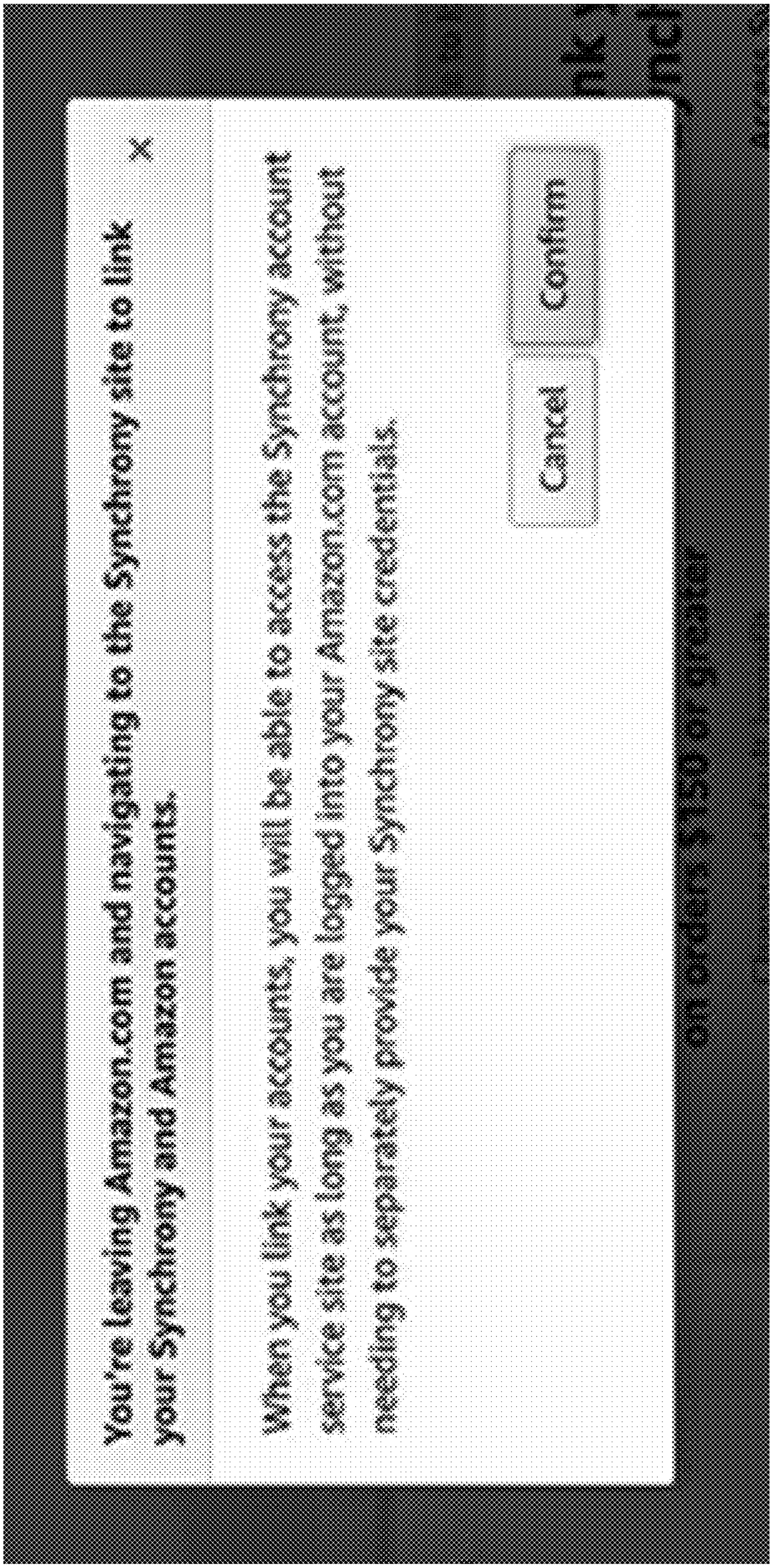
FIG. 2B is a screenshot of an exemplary notification to the user regarding their departure from the first online business website and transport to the second online business website.
Figure 2C:
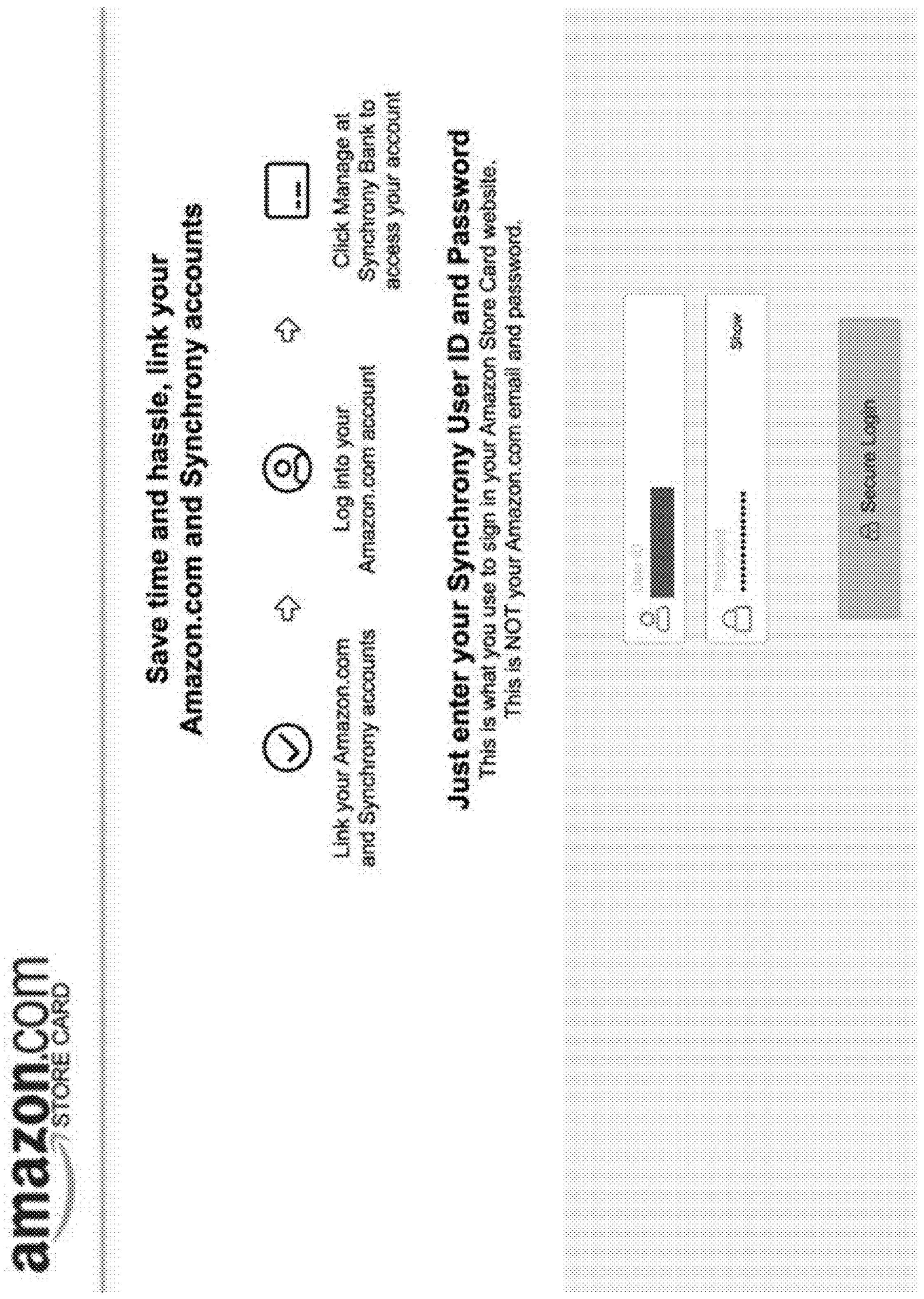
FIG. 2C is a screenshot of an exemplary login webpage associated with the second online business.
Figure 2D:
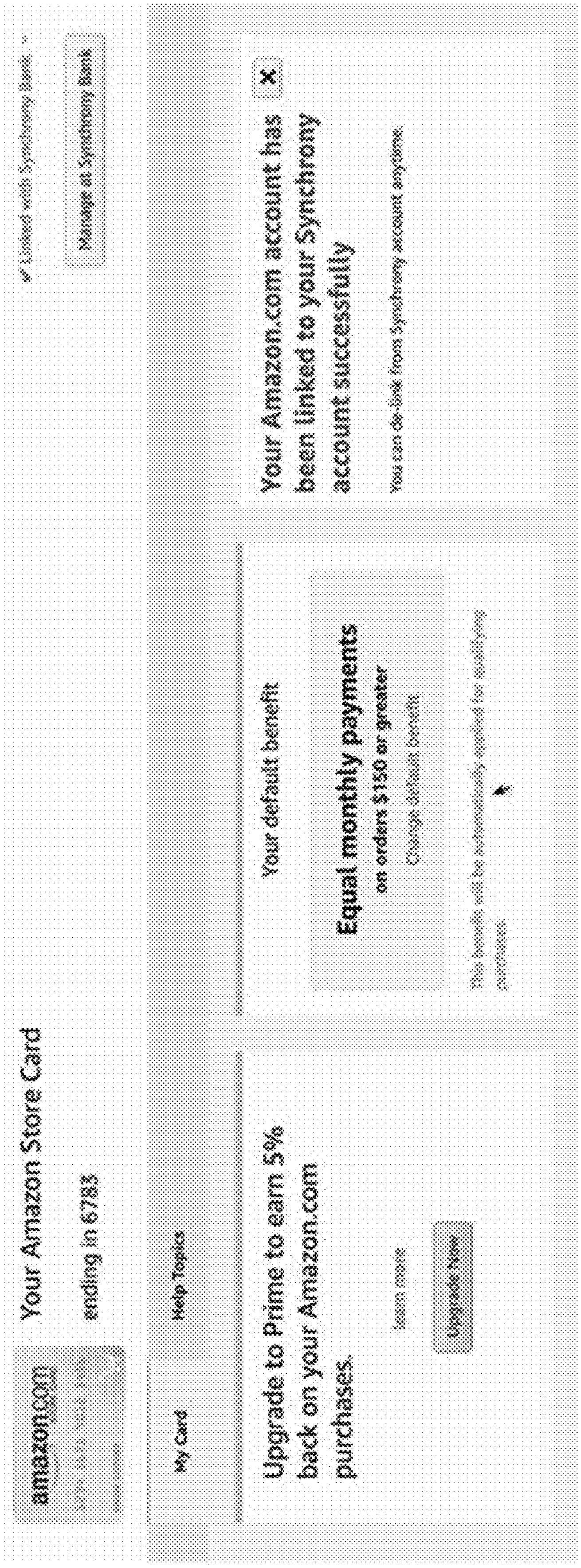
FIG. 2D is a screenshot of an exemplary first online business account that has been linked to the second online business account.
Figure 2E:
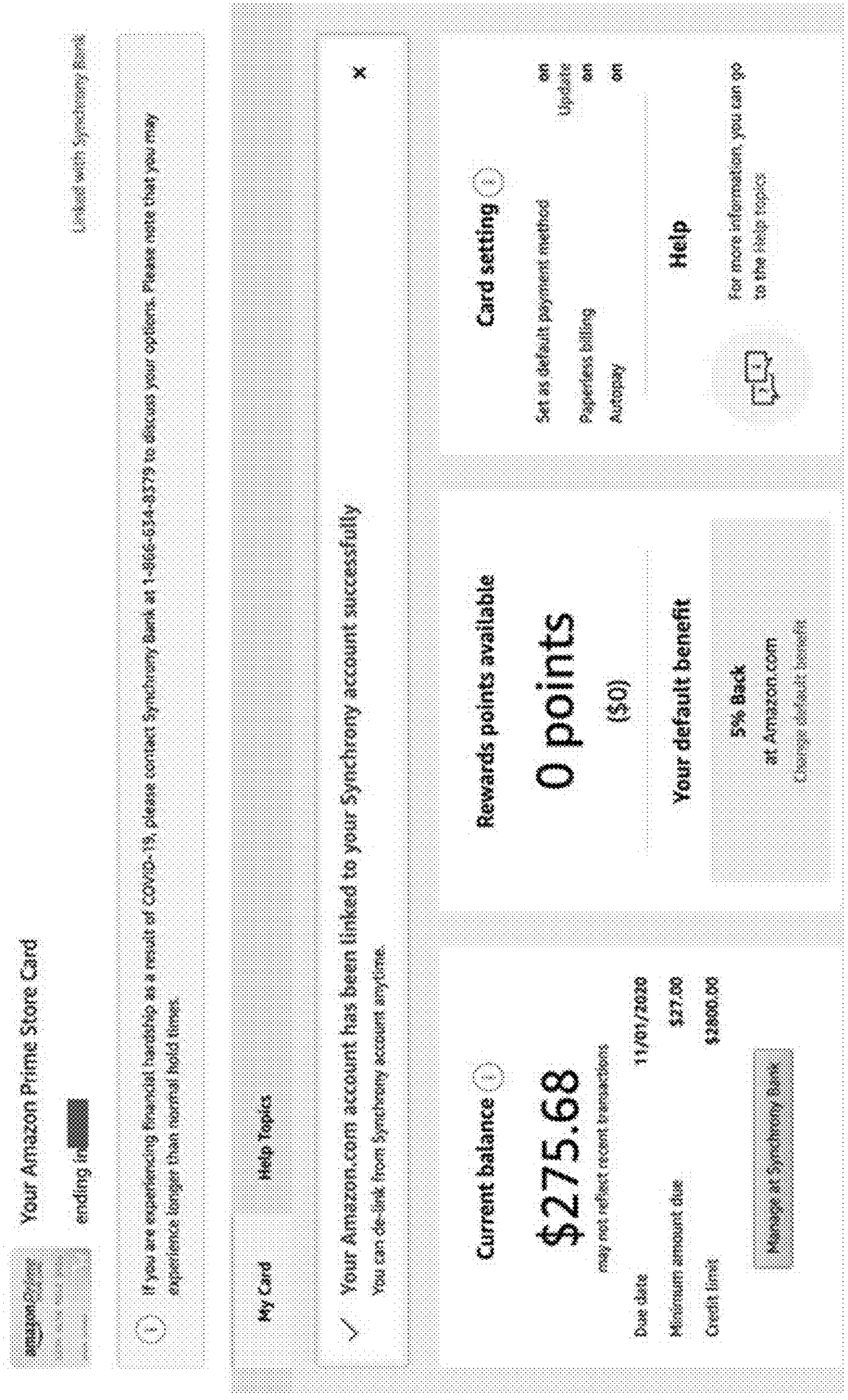
FIG. 2E is a screenshot of an exemplary landing page that may be presented to the user upon being logged in directly with the second online business.
Figure 2F:
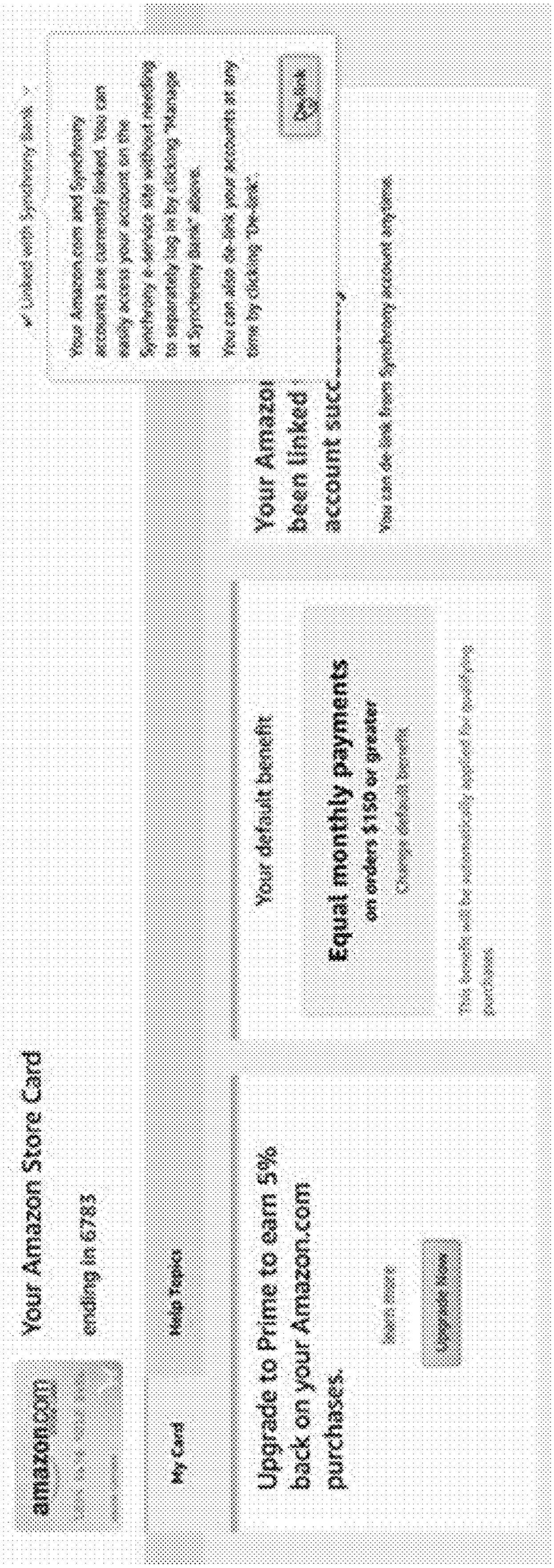
FIG. 2F is a screenshot of an exemplary option button for de-linking the first and second online business accounts of the specific user.
Figure 2G:
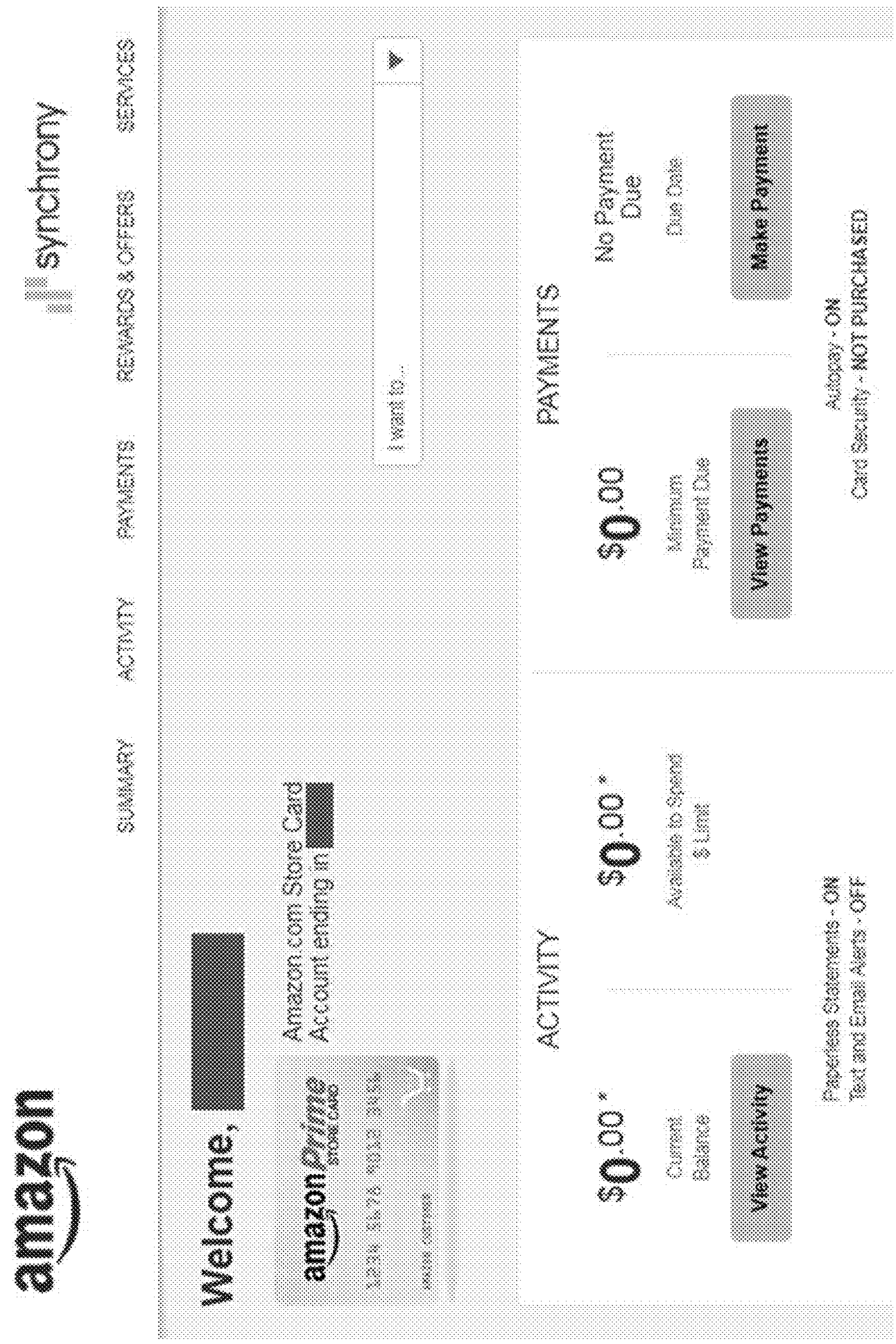
FIG. 2G is a screenshot of an exemplary webpage associated with full service management associated with the second online business.
Figure 3:
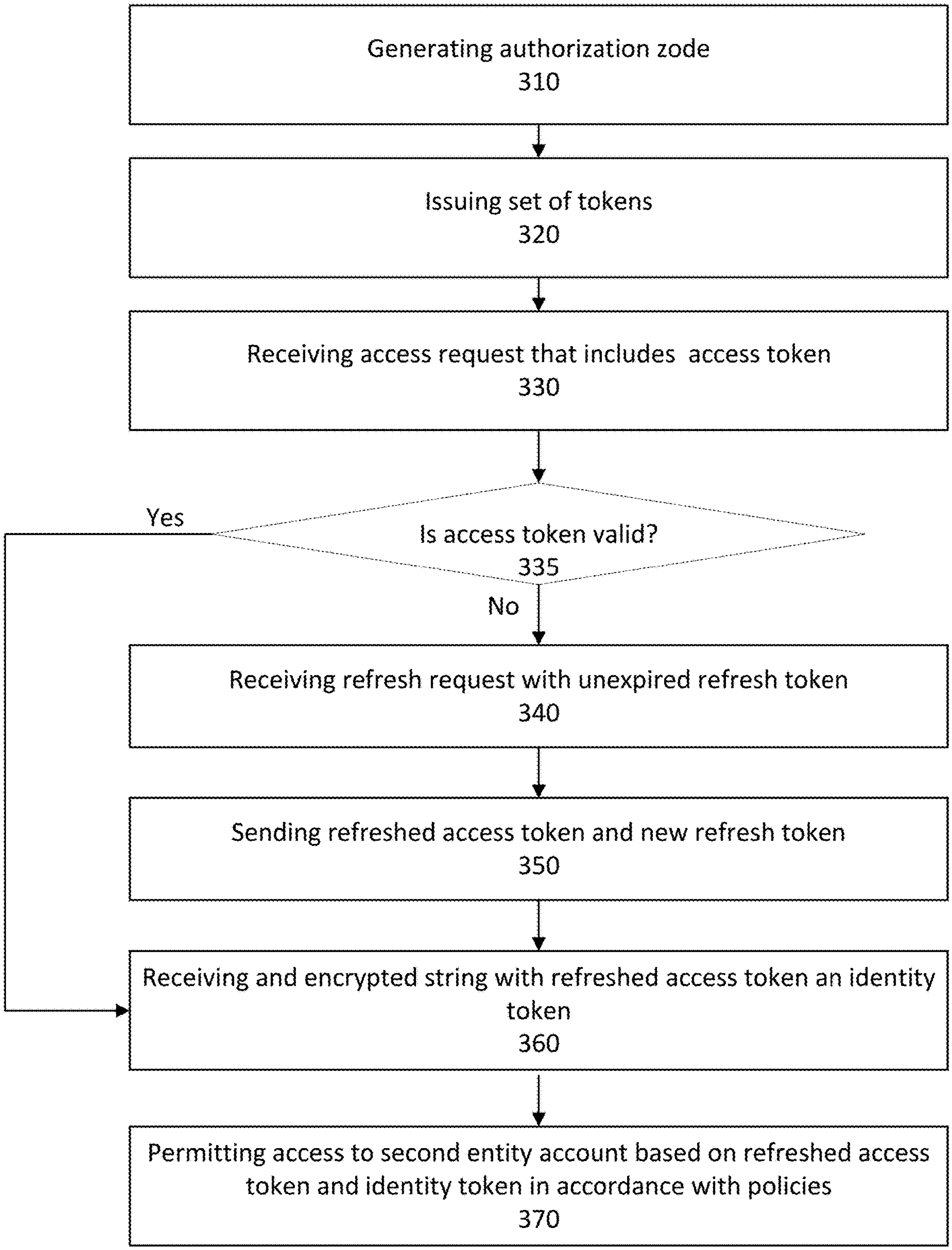
FIG. 3 is a flowchart illustrating an exemplary method of persistent login.

FIGS. 2A-2G illustrates a variety of screenshots that may be generated and presented to a user during the method illustrated in FIG. 3, which is a flowchart illustrating an exemplary method of persistent login. Such method may include linking the accounts of two (or more) different entities that each control their respective security processes and resources and then providing for persistent login based on the linked accounts. The persistent login and associated account linkage allows a user to access and manage their account information from different accounts maintained by different entities in a streamlined and secure manner. Moreover, each entity may continue to establish and enforce their own respective security policies as to the different types of account information and functions. The example illustrated in FIGS. 2A-G allows for a user to link accounts associated with an e-commerce website and a funding source (e.g., bank).

FIG. 2A is an exemplary screenshot of a webpage associated with a first entity. In the illustrated example, the first entity may be an online business. The illustrated webpage may be presented to a user that has already logged in and been authenticated by the first online business ("Amazon.com"). In particular, the webpage illustrated in the screenshot of FIG. 2A includes a link ("Link your Amazon.com and Synchrony account") that offers the user the option of linking their e-commerce account with their respective account associated with a second entity (or online business) that may have partnered with the first online business. In some embodiments, the user may be presented with options for linking to multiple different accounts (of different entities). In some embodiments, an entity may be associated with multiple brands and platforms (e.g., mobile application, mobile website, desktop website). The first entity may wish to manage such brands or platforms together (e.g., universal control) or separately. In some instances, the second entity may require separate channels to be used for each brand or platform. In such cases, accounts associated with each brand or platform may be separately linked to a second entity account; such account linking may therefore be controlled at the brand or platform level, and persistent login may be separately controlled in relation to specific brands or platforms. Terminating persistent login for one brand or platform, for example, may be accomplished without terminating persistent login for other brands or platforms associated with the terminating entity.

Upon activation of the link, the user may be transported to another website. The screenshot of FIG. 2B illustrates an exemplary notification to the user regarding their departure from the first online business website 115A and transport to the second online business website 115B or web application 120B. As provided in the notification, the transport to the second online business website allows the user to provide authentication credentials at the second online business, which therefore does not have to rely entirely on the first online business to manage user identity.

FIG. 2C illustrates an exemplary login webpage associated with the second online business. The URL that transported the user from the webpage of FIG. 2A to the present webpage of FIG. 2C may include metadata that conveys information to the second online business about the user account with the first online business. In some instances, additional security measures or checks may be implemented to ensure the correct accounts are linked. For example, the first online business may need to provide certain account data (e.g., last 4 digits of an account number of the second business) before the linking process is allowed to proceed.

The webpage illustrated in the screenshot of FIG. 2C asks the user to provide credentials (e.g., user ID and password) that are associated with the second online business (e.g., Synchrony Bank). Such credentials are specific to the second online business and may have been established when the user opened or otherwise registered an account with the second online business. In some embodiments, the second online business may perform any variety of security checks known in the art for authenticating and verifying the user and their authorizations (e.g., device checks, validate accounts, rules enforcement).

For example, the second entity system 110B may perform a device check of user device 145 and develop a risk profile in real-time based on different factors present during the call to link accounts. Depending on the level of risk indicated by the risk profile, additional security measures (e.g., multi-factor authentication) may be required before proceeding with linking the accounts. Risk factors considered may include whether the device has been used before in associated with access to the second entity account, geographic location, prior logins, login frequency, and other risk factors known in the art. Whether a risk profile calls for additional security measures (and which ones) may be defined by the second entity (e.g., and maintained in policy database 125B). As such, the second entity may continue to update and tune the rules over time. In some embodiments, data regarding the risk factors and risk profiles may be tracked over time, along with associated rules adjustments. Artificial intelligence (AI) and machine learning (ML) techniques may further be applied to such data in order to refine rules adjustments in real time based on patterns and trends detected within the risk factors and risk profiles. For example, historical data may be tracked as to risk associated with user devices 145 from different locations, and comparisons may indicate a spike in persistent login requests coming from user devices 145 in Russia or the Ukraine. Such spike may be indicative of higher levels of risk, and the rules may be adjusted in real-time to require stepped-up authentication requirements in response to the same.

While the user may be presented with the screenshots presented in FIGS. 2A-2G, the components of FIG. 1 (e.g., persistent login proxies 140A-B and OAuth proxy 150) may be operating in conjunction to implement account linkage and persistent login in accordance with the method illustrated in FIG. 3. As discussed herein, there may be time limitations on persistent login so as to avoid security risks and otherwise enforce and maintain compliance with security requirements, rules, and policies of the different entities. The method for persistent login allows, however, for logins to persist under certain circumstances, as well as reducing the number of times the user is required to re-authenticate and/or log in again.

In step 310 of FIG. 3, an authorization code may be generated based on the authentication of user in relation to the first entity. An authorization code may be generated (e.g., in accordance with standard OAuth 2.0 specifications) by web application 120 or other component (e.g., persistent login proxy 140A) associated with the first entity. Such authorization code may be valid for a specified time period (e.g., five seconds). The authorization code may be provided (e.g., via OAuth proxy 150) to the second entity (e.g., persistent login proxy 140B).

In step 320 of FIG. 3, the second entity may issue a set of tokens in response to the authorization code. Such set of tokens may include an access token, refresh token, and identity token. The token set may be provided to the first entity when the first entity website 110 makes a service call to the second entity. Such service call may include exchanging the authorization code for the set of tokens, which may thereafter be validated and stored by the first entity in association with the user account (e.g., Amazon.com user account).

The first entity may thereafter use the issued (and validated) tokens to access and retrieve information maintained by the second entity. Such access may be streamlined, as the user may no longer be required to enter and re-enter credentials for the second entity as often.

Based on the tokens linking the respective user accounts of the first and second entities, the user may be presented with a webpage corresponding to the screenshot of FIG. 2D. As illustrated, the screenshot of FIG. 2D indicates that the first online business account (e.g., Amazon.com user account for the user) has been linked to the second online business account (e.g., Synchrony user account for the user). In addition, secured, real-time information from the respective user accounts may be used to populate a webpage associated with the first entity. The linked accounts may further allow the user to access certain secured services (e.g., adding another authorized user) associated with the second online business. As noted before, the webpage may be associated with the first online business, such as a user account webpage that may be presented to the user who is logged into the first online business. Notwithstanding and unlike prior implementations (e.g., traditional SSO), the second online business retains a degree of control over the types and extents of information and services provided that had been available before.

Over a period time, the user may pause or cease interacting with the webpage (e.g., goes to another website). To allow the user to access the same set of data again (e.g., from both accounts). To maintain streamlined access, the accounts may remain linked for a predetermined period of time based on the validity of the issued tokens. Each token may have a respective period of time during which the token is valid. After expiration of the associated period of time, however, the tokens are no longer valid and may need to be replaced or otherwise refreshed.

In step 330 of FIG. 3, an access request (including the access token) may be sent from the first online business to the second online business. Such access request may be sent when a user at the first online business website seeks to access information associated with the second online business account. In an exemplary workflow, the first online business may verify that the current secured session is still active (e.g., whether the user remains logged in at Amazon.com). If not, the user may be requested to log into the first online business account by providing the credentials specific to the first online business. Once the user has been authenticated with the first online business, the website may make a call (associated with the access token) for certain information or services from the second online business.

In step 335 of FIG. 3, it may be determined whether the access token is valid. Such check may be performed once the user has been confirmed as having logged back in with the first online business. The first online business may check the validity of the access token (associated with the second online business). For example, the first entity (e.g., Amazon.com) server may communicate with a second (e.g., Synchrony) endpoint server to confirm that the access token associated with linking the two accounts is valid. No other information regarding the user may need to be exchanged other than confirmation that the access token remains valid.

If the access token is valid, the method may proceed to step 360. If the access token is not valid, the method may proceed to step 340 of FIG. 3 in which a refresh request including the refresh token may be sent. In some embodiments, the access token may be association with a predetermined time period (e.g., one hour), after which the access token may expire and become invalid. If the access token has become invalid, step 340 may include the first online business server thereafter pinging the same or different endpoint of the second online business with the associated refresh token. In some embodiments, persistent login may be governed by a different set of rules than the rules governing account linking. As such, depending on the risk profile and the rules governing persistent login in association with indicated risk level, different security checks may be performed in order to determine whether stepped-up security measures (e.g., multi-factor authentication) may be required before issuing a new access token or refreshing the access token.

In step 350, a new (or refreshed) access token, as well as a new refresh token, may be issued and sent to the first entity. Like the access token, the refresh token may also be configured with an expiration date (e.g., ninety (90) days from generation date). As long as the user continues to use the linked accounts within the timeframe during which the refresh token is valid (e.g., at least once every ninety days), the refresh token continues to be refreshed and valid, thereby allowing for the linkage to persist over time. As such, users who may frequently access the webpage(s) populated with data obtained using persistent login are not required to re-enter credentials of the second online entity. The period of expiration may be set, adjusted, or otherwise updated by the second entity in accordance with their respective policies (e.g., from policy database 125B). Such adjustments may be specific to the first entity, such that subsequent access tokens (and refresh tokens and authorization codes) issued for linking accounts between the first entity and the second entity may have adjusted longevity.

Once the access token has been confirmed as valid (or refreshed so as to be valid), the first online business server may generate an encrypted payload (e.g., URL safe string) based on the validated access token and the associated identity token in step 360 of FIG. 3. In step 370, such payload may be directed and handed off to the second online business server (e.g., a Synchrony server), which may thereafter decrypt the payload (e.g., by way of a back-end service), validate the access token and identity tokens, confirm that both of the provided tokens are associated with the same user account of the second online business, and pull data (e.g., user identifier) and look-up related data from the user account based on the identity token. In some embodiments, use of the access token may be limited to one attempt. As such, regardless of whether the access token is deemed valid or not, the first online business server may be required to refresh the access token as described herein in order to conduct a next persistent login attempt successfully. In some instances, an entity may specify a quota as to how many times the access token may be used for a specific service or over a specific period of time.

Meanwhile, the second online business may further apply all of the rules, policies, etc., in accordance with their specific requirements. Various additional security checks may be performed regarding the user device or account status, for example. If the security checks are successful, the user may be taken to a landing page such as illustrated in the screenshot of FIG. 2E. Such landing page may correspond to what the user is normally presented with if the user had logged in with the second online business directly. As described herein, however, the user may only need to supply credentials once (e.g., upon account linkage) and the link may persist as long as the user continues to access the linked accounts during the time period in which the refresh token remains valid.

In some embodiments, an API may be provided that allows for the data of the landing page to be presented via a webpage associated with the first online business. Rather than presenting the user with a landing page associated with the second online business (e.g. of Synchrony Bank), therefore, the user may be presented instead with a webpage associated with the first online business (e.g., Amazon.com) but that presents the data obtained from the second online business. In other words, the webpage in the screenshot of FIG. 2E may be presented by either the servers of the first online business (e.g., on Amazon.com) or of the second online business (e.g., on Amazon.SYF.com).

In some embodiments, certain types of data may be subject to higher security standards. For example, certain types of user data (e.g., credit line increase, adding an authorized user) may be associated with higher risk than other data (e.g., check status, available credit, current balance, next payment due date). Such data may therefore be categorized (e.g., by risk), and the access token may be associated with a scope of risk. As such, the first online business may make service call s to various endpoints of the second business in accordance with the respective scope of risk of the access token being used. Be Additional or step-up security requirements may be required, for example, where the access token is associated with a low-risk scope only, but the requested service is considered high-risk. Such higher risk service may require involvement of different endpoint servers of the second online business. Attempts to use a low-risk access token to call upon the endpoints associated with higher-risk transactions may fail based on the mismatch between the scope of the access token and the category of the requested service or data associated therewith. A different workflow may be initiated, however, to obtain stepped-up credentials or other security measures in order to change the scope of the current access token or issue a new access token having the appropriate scope to access the requested service or data.

FIG. 2G is a screenshot of an exemplary webpage associated with full service management associated with the second online business. Such a screen may be presented when the user of user device 145 chooses to go to full servicing by clicking on "Manage at Synchrony Bank" after the accounts have been linked. The user may then be authenticated again before landing on a landing page associated with the second entity (e.g., SYF servicing summary page).

The user may also be given the option to de-link accounts. For example, FIG. 2F illustrates an option button for de-linking the first and second online business accounts of the specific user. As such, if the user wishes to access the second online business by way of the first online business website, the user may be requested to undergo the linking process again and resupply credentials in order to link the accounts and use persistent login.

As discussed, users may use any number of different electronic user devices to initiate transactions within the network environment, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

Further, the entities discussed herein—including the respective websites and services—may perform the disclosed actions using any type of computing device or server known in the art, including standard hardware computing components such as network and media interfaces, non-transitory computer-readable storage (memory), and processors for executing instructions or accessing information that may be stored in memory. In different embodiments, the functions may be distributed over multiple network devices, or the functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Figure 4:
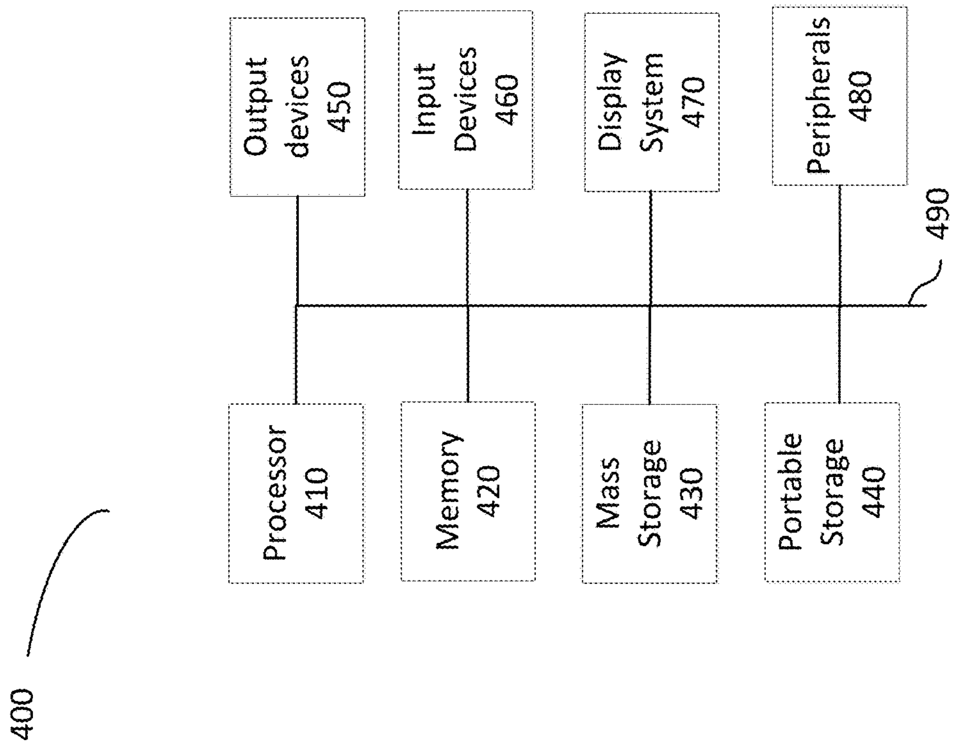
FIG. 4 is a block diagram of an exemplary computing system that may be used to implement an embodiment of the present invention.

FIG. 4 is a block diagram of an exemplary computing system 400 that may be used to implement an embodiment of the present invention. An example computing system can include a processor 410 (e.g., a central processing unit), memory (including non-volatile memory) 420-440, an interface devices 450-460, display device 470, and peripheral(s) 470. The memory 420, mass storage 430, and portable storage 440 may store data and/or and one or more code sets, software, scripts, etc. The components of the computer system can be coupled together via a bus 490 or through some other known or convenient device. The processor 410 may be configured to carry out all or part of methods described herein for example by executing code for example stored in memory. One or more of a user device or computer, a provider server or system, or a suspended database update system may include the components of the computing system or variations on such a system.

The processor 410 may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor 410.

The memory and storage 420-440 can be coupled to the processor 410 by, for example, a bus 490. The memory 420-440 can include, by way of example but not limitation, random access memory (RAM), such as dynamic RAM (DRAM) and static RAM (SRAM). The memory 420-440 can be local, remote, or distributed.

The bus 490 can also couples the processor 410 to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor 410, memory, and a device (e.g., a bus) coupling the memory to the processor 410.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor 410 can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor 410 is considered to be "configured to execute a program" when at least one value associated with the program is stored in a register readable by the processor 410.

The bus 490 can also couples the processor 410 to the network interface device. The interface can include one or more of a modem or network interface. It will be appreciated that a modem or network interface can be considered to be part of the computer system. The interface can include an analog modem, Integrated Services Digital network (ISDNO modem, cable modem, token ring interface, satellite transmission interface (e.g., "direct PC"), or other interfaces for coupling a computer system to other computer systems. The interface can include one or more input and/or output (I/O) devices 450-460. The I/O devices 450-460 can include, by way of example but not limitation, a keyboard, a mouse or other pointing device, disk drives, printers, a scanner, and other input and/or output devices, including a display device 470. The display device 470 can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor 410 to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:

detecting activation of an option to link a first service account with a second service account, wherein the first service account and the second service account are associated with a user, and wherein the user is authenticated with a first service providing the first service account;

re-directing the user to a website corresponding to a second service, wherein the second service is associated with the second service account, and wherein when the user is re-directed to the website, the user is prompted for a set of credentials associated with the second service account;

authenticating the set of credentials, wherein when the set of credentials is authenticated, the second service links the first service account to the second service account;

receiving an authorization code in response to the first service account being linked to the second service account, wherein the authorization code is generated as a result of the user being authenticated with the first service; and issuing a set of tokens in response to the authorization code, wherein the set of tokens is usable to retrieve information maintained in the second service account without requiring the set of credentials, wherein the set of tokens is subject to an expiration period, wherein when the set of tokens is received by the first service, the first service stores the set of tokens in association with the first service account, and wherein the first service account and the second service account remain linked until the expiration period has elapsed.

2. The computer-implemented method of claim 1, further comprising:

generating a risk profile associated with the user, wherein the risk profile is generated based on a device check of a user device associated with the user; and performing one or more security measures based on the risk profile, wherein the one or more security measures are performed before issuing the set of tokens.

3. The computer-implemented method of claim 1, wherein the option includes a Uniform Resource Locator (URL) corresponding to the website, and where the URL includes metadata that incorporates information associated with the first service account.

4. The computer-implemented method of claim 1, wherein when the user is re-directed to the website, the first service provides account data associated with the first service account.

5. The computer-implemented method of claim 1, further comprising:

receiving a request for data corresponding to the second service account, wherein the request includes an access token from the set of tokens; and providing the data, wherein when the data is provided, the first service updates a website associated with the first service to present the data.

6. The computer-implemented method of claim 1, wherein the set of tokens includes a refresh token and an access token, and wherein the refresh token is used to generate new access tokens when the access token is expired.

7. A system, comprising:

one or more processors; and memory storing thereon instructions that, as a result of being executed by the one or more processors, cause the system to:

detect activation of an option to link a first service account with a second service account, wherein the first service account and the second service account are associated with a user, and wherein the user is authenticated with a first service providing the first service account;

re-direct the user to a website corresponding to a second service, wherein the second service is associated with the second service account, and wherein when the user is re-directed to the website, the user is prompted for a set of credentials associated with the second service account;

authenticate the set of credentials, wherein when the set of credentials is authenticated, the second service links the first service account to the second service account;

receive an authorization code in response to the first service account being linked to the second service account, wherein the authorization code is generated as a result of the user being authenticated with the first service; and issue a set of tokens in response to the authorization code, wherein the set of tokens is usable to retrieve information maintained in the second service account without requiring the set of credentials, wherein the set of tokens is subject to an expiration period, wherein when the set of tokens is received by the first service, the first service stores the set of tokens in association with the first service account, and wherein the first service account and the second service account remain linked until the expiration period has elapsed.

8. The system of claim 7, wherein the instructions further cause the system to:

generate a risk profile associated with the user, wherein the risk profile is generated based on a device check of a user device associated with the user; and perform one or more security measures based on the risk profile, wherein the one or more security measures are performed before issuing the set of tokens.

9. The system of claim 7, wherein the option includes a Uniform Resource Locator (URL) corresponding to the website, and where the URL includes metadata that incorporates information associated with the first service account.

10. The system of claim 7, wherein when the user is re-directed to the website, the first service provides account data associated with the first service account.

11. The system of claim 7, wherein the instructions further cause the system to:

receive a request for data corresponding to the second service account, wherein the request includes an access token from the set of tokens; and provide the data, wherein when the data is provided, the first service updates a website associated with the first service to present the data.

12. The system of claim 7, wherein the set of tokens includes a refresh token and an access token, and wherein the refresh token is used to generate new access tokens when the access token is expired.

13. A non-transitory computer-readable storage medium storing thereon executable instructions that, as a result of being executed by one or more processors of a computer system, cause the computer system to:

detect activation of an option to link a first service account with a second service account, wherein the first service account and the second service account are associated with a user, and wherein the user is authenticated with a first service providing the first service account;

re-direct the user to a website corresponding to a second service, wherein the second service is associated with the second service account, and wherein when the user is re-directed to the website, the user is prompted for a set of credentials associated with the second service account;

authenticate the set of credentials, wherein when the set of credentials is authenticated, the second service links the first service account to the second service account;

receive an authorization code in response to the first service account being linked to the second service account, wherein the authorization code is generated as a result of the user being authenticated with the first service; and issue a set of tokens in response to the authorization code, wherein the set of tokens is usable to retrieve information maintained in the second service account without requiring the set of credentials, wherein the set of tokens is subject to an expiration period, wherein when the set of tokens is received by the first service, the first service stores the set of tokens in association with the first service account, and wherein the first service account and the second service account remain linked until the expiration period has elapsed.

14. The non-transitory computer-readable storage medium of claim 13, wherein the executable instructions further cause the computer system to:

generate a risk profile associated with the user, wherein the risk profile is generated based on a device check of a user device associated with the user; and perform one or more security measures based on the risk profile, wherein the one or more security measures are performed before issuing the set of tokens.

15. The non-transitory computer-readable storage medium of claim 13, wherein the option includes a Uniform Resource Locator (URL) corresponding to the website, and where the URL includes metadata that incorporates information associated with the first service account.

16. The non-transitory computer-readable storage medium of claim 13, wherein when the user is re-directed to the website, the first service provides account data associated with the first service account.

17. The non-transitory computer-readable storage medium of claim 13, wherein the executable instructions further cause the computer system to:

receive a request for data corresponding to the second service account, wherein the request includes an access token from the set of tokens; and provide the data, wherein when the data is provided, the first service updates a website associated with the first service to present the data.

18. The non-transitory computer-readable storage medium of claim 13, wherein the set of tokens includes a refresh token and an access token, and wherein the refresh token is used to generate new access tokens when the access token is expired.

19. The computer-implemented method of claim 1, wherein the authorization code is provided through a service call generated by the first service based on the user being authenticated in relation to the first service.

20. The system of claim 7, wherein the authorization code is provided through a service call generated by the first service based on the user being authenticated in relation to the first service.

21. The non-transitory computer-readable storage medium of claim 13, wherein the authorization code is provided through a service call generated by the first service based on the user being authenticated in relation to the first service.

* * * * *